United States Patent
Spruit et al.

(10) Patent No.: US 11,119,021 B2
(45) Date of Patent: Sep. 14, 2021

(54) LASER SENSOR FOR ULTRA-FINE PARTICLE SIZE DETECTION

(71) Applicant: TRUMPF Photonic Components GmbH, Ulm (DE)

(72) Inventors: Johannes Hendrikus Maria Spruit, Eindhoven (NL); Alexander Marc Van Der Lee, Eindhoven (NL); Petrus Theodorus Jutte, Eindhoven (NL); Cornelis Reinder Ronda, Eindhoven (NL); Pascal De Graaf, Eindhoven (NL); Holger Moench, Eindhoven (NL); Joachim Wilhelm Hellmig, Eindhoven (NL)

(73) Assignee: TRUMPF PHOTONIC COMPONENTS GMBH, Ulm (DE)

(*) Notice: Subject to any disclaimer, the term of this patent is extended or adjusted under 35 U.S.C. 154(b) by 299 days.

(21) Appl. No.: 16/086,046

(22) PCT Filed: Mar. 21, 2017

(86) PCT No.: PCT/EP2017/056702
§ 371 (c)(1),
(2) Date: Sep. 18, 2018

(87) PCT Pub. No.: WO2017/162677
PCT Pub. Date: Sep. 28, 2017

(65) Prior Publication Data
US 2020/0292435 A1 Sep. 17, 2020

(30) Foreign Application Priority Data
Mar. 21, 2016 (EP) .................. 16161414.4

(51) Int. Cl.
G01N 15/02 (2006.01)
G01N 15/14 (2006.01)
G01N 15/00 (2006.01)

(52) U.S. Cl.
CPC ..... G01N 15/0211 (2013.01); G01N 15/1434 (2013.01); G01N 15/1459 (2013.01);
(Continued)

(58) Field of Classification Search
CPC ... G01N 2015/1454; G01N 2015/0046; G01N 15/1434; G01N 15/06; G01N 2015/0693;
(Continued)

(56) References Cited

U.S. PATENT DOCUMENTS

| 6,233,045 B1 | 5/2001 | Suni et al. |
| 7,439,484 B2 | 10/2008 | Liess et al. |

(Continued)

FOREIGN PATENT DOCUMENTS

| CN | 1411587 A | 4/2003 |
| CN | 102297823 A | 12/2011 |

(Continued)

OTHER PUBLICATIONS

Zhang, et al., "Measurement Technique on Nanoparticles with Laser-Diode Self-Mixing Interferometry Based on Bandpass Filters," *Acta Optics* 32, 5: 1-7 (May 31, 2012).

(Continued)

*Primary Examiner* — Michael P Stafira
(74) *Attorney, Agent, or Firm* — Leydig, Voit & Mayer, Ltd.

(57) ABSTRACT

The invention describes a laser sensor module (100) for detecting ultra-fine particles (10) with a particle size of 300 nm or less, more preferably 200 nm or less, most preferably 100 nm or less, the laser sensor module (100) comprising: —at least one laser (110) being adapted to emit
(Continued)

laser light to at least one focus region in reaction to signals provided by at least one electrical driver (130), —at least one detector (120) being adapted to determine a self-mixing interference signal of an optical wave within a laser cavity of the at least one laser (110), wherein the self-mixing interference signal is caused by reflected laser light reentering the laser cavity, the reflected laser light being reflected by a particle receiving at least a part of the laser light, —the laser sensor module (100) being arranged to perform at least one self-mixing interference measurement, —the laser sensor module (100) being adapted to determine a first particle size distribution function with a first sensitivity by means of at least one measurement result determined based on the at least one self-mixing interference measurement, the laser sensor module being further adapted to determine a second particle size distribution function with the second sensitivity, the second sensitivity being different from the first sensitivity, —the at least one evaluator (140) being adapted to determine a particle measure of the particle size of 300 nm or less by subtracting the second particle size distribution function multiplied with a calibration factor q from the first particle size distribution function. The invention further describes a corresponding method and computer program product. The invention enables a simple and low-cost particle detection module or particle detector based on laser self-mixing interference which can detect particles with a size of 100 nm or even less.

20 Claims, 9 Drawing Sheets

(52) U.S. Cl.
CPC ............... *G01N 2015/0042* (2013.01); *G01N 2015/1454* (2013.01); *G01N 2015/1493* (2013.01)

(58) Field of Classification Search
CPC ....... G01N 2015/1075; G01N 15/0205; G01N 2015/1486; G01N 2015/1493; G01N 15/1429; G01N 15/1456; G01N 2015/1452; G01N 2015/1438; G01N 15/0211; G01N 15/1431; G01N 2015/0003; G01N 2015/03; G01N 2015/1447; G01N 21/39; G01N 15/14; G01N 15/1459; G01N 2015/0294; G01N 2015/149; G01N 2015/1497; G01N 2021/399; G01N 21/0303; G01N 21/255; G01N 21/3504; G01N 21/45; G01N 2201/06113; G01N 2201/08; G01N 2201/12; G01N 2291/011; G01N 2291/0289; G01N 2291/106; G01N 29/07; G01N 15/0227; G01N 15/10; G01N 2001/2276; G01N 2015/003; G01N 2015/0038; G01N 2015/0042; G01N 2015/0053; G01N 2015/0222; G01N 2015/1087; G01N 2015/1445; G01N 2021/0346; G01N 2021/391; G01N 2021/451; G01N 2021/8416; G01N 21/03; G01N 21/0332; G01N 21/359; G01N 2201/0221; G01N 33/0036; G01N 33/54373; G01N 15/12; G01N 15/1012; G01N 2015/1006; G01N 33/0006; G01N 33/0032; G01N 33/007; G01N 2015/0065; G01N 2291/0258; G01N 2291/02854; G01N 2291/044; G01N 29/28; G01N 15/1404; G01N 15/1463; G01N 15/1484; G01N 2021/4707; G01N 2021/6439; G01N 21/05; G01N 21/53; G01N 21/64; G01N 21/6408; G01N 21/6428; G01N 21/85; G01N 2201/0612; G01N 2291/0231; G01N 2291/051; G01N 2291/2634; G01N 2291/2636; G01N 29/00; G01N 29/225; G01N 29/265; G01N 15/02; G01N 15/1436; G01N 15/147; G01N 2001/002; G01N 2001/028; G01N 2015/0011; G01N 2015/0073; G01N 2015/008; G01N 2015/0084; G01N 2015/025; G01N 2015/0288; G01N 2015/0687; G01N 2015/1081; G01N 2015/1488; G01N 2021/458; G01N 2021/772; G01N 2021/773; G01N 2021/7779; G01N 2035/00237; G01N 2035/00326; G01N 21/00; G01N 21/1702; G01N 21/3577; G01N 21/51; G01N 21/532; G01N 21/645; G01N 21/6458; G01N 21/648; G01N 21/658; G01N 21/7703; G01N 21/88; G01N 2201/024; G01N 2201/068; G01N 2201/10; G01N 2291/2694; G01N 2500/10; G01N 27/3275; G01N 27/447; G01N 27/82; G01N 29/04; G01N 29/043; G01N 29/222; G01N 29/223; G01N 29/2468; G01N 29/326; G01N 29/46; G01N 33/483; G01N 33/48714; G01N 33/5008; G01N 33/502; G01N 33/5026; G01N 33/5044; G01N 33/5308; G01N 33/542; G01N 33/543; G01N 33/54366; G01N 33/569; G01N 33/56966; G01N 33/56983; G01N 33/582; G01N 35/00722; G01N 35/08; G01B 9/02092; G01B 11/026; G01B 11/14; G01B 11/161; G01B 9/02004; G01B 9/02083; G01B 11/16; G01B 11/18; G01B 9/02027; G01B 9/02045; G01B 9/02075; G01B 17/025; G01B 11/0616; G01B 11/24; G01B 11/303; G01B 17/06; G01B 17/08; G01B 17/02; G01B 7/105; G01J 1/0403; G01J 3/0262; G01J 3/4338; G01J 9/02; G01J 9/0246; G01J 3/02; G01J 3/2803; G01J 3/433; G01J 3/4412; G01J 3/45; G01J 3/50; G01J 2003/2826; G01J 3/0248; G01J 3/10; G01J 3/44; G01J 3/4406; G02B 1/04; G02B 1/06; G02B 1/14; G02B 21/0064; G02B 21/0076; G02B 21/16; G02B 3/12; G02B 3/14; G02B 5/208; G02B 5/223
See application file for complete search history.

(56) References Cited

U.S. PATENT DOCUMENTS

| 8,416,424 | B2 | 4/2013 | Werner et al. | |
|---|---|---|---|---|
| 2002/0104957 | A1 | 8/2002 | Liess et al. | |
| 2007/0013910 | A1* | 1/2007 | Jiang | G01N 15/0205 356/336 |
| 2009/0323061 | A1 | 12/2009 | Novotny et al. | |
| 2012/0200858 | A1* | 8/2012 | Pruijmboom | G01B 9/02028 356/477 |

(56) References Cited

U.S. PATENT DOCUMENTS

2014/0132943 A1     5/2014  Chou
2015/0020804 A1     1/2015  Bentvelsen et al.
2016/0313243 A1*   10/2016  Dittrich .............. G01N 15/1434

FOREIGN PATENT DOCUMENTS

| CN | 102564909 A | 7/2012 |
| CN | 103889488 A | 6/2014 |
| CN | 104458514 A | 3/2015 |
| EP | 1716476 A1 | 11/2006 |
| JP | 2000171384 A | 6/2000 |
| WO | 0237410 A1 | 5/2002 |
| WO | WO 2005076116 A2 | 8/2005 |
| WO | WO 2009095679 A2 | 8/2009 |

OTHER PUBLICATIONS

Sudol et al "Quick and Easy Measurement of Particle Size of Brownian Particles and Planktons in Water Using Self Mixing Laser" Optics Express vol. 14, No. 3, Feb. 6, 2006 p. 1044-1054.
Giuliani et al "Laser Diode Self Mixing Technique for Sensing Applications" Journal of Optics A: Pure and Applied Optics 2002, p. S283-S294.

\* cited by examiner

LASER SENSOR FOR ULTRA-FINE PARTICLE SIZE DETECTION

CROSS-REFERENCE TO PRIOR APPLICATIONS

This application is the U.S. National Phase application under 35 U.S.C. § 371 of International Application No. PCT/EP2017/056702, filed on Mar. 21, 2017, which claims the benefit of EP Patent Application No. EP 16161414.4, filed on Mar. 21, 2016. These applications are hereby incorporated by reference herein.

FIELD OF THE INVENTION

The invention relates to a laser sensor or laser sensor module for ultra-fine particle size detection and a related method of ultra-fine particle size detection. The invention further relates to a corresponding computer program product.

BACKGROUND OF THE INVENTION

Generally, it is believed that optical techniques are not able to detect ultrafine particle (particle sizes in the order of 300 nm or less). The effective reflection of a particle decreases drastically with particle size, not only due to their small size but additional due to a reduced backscattering efficiency given by the MIE scattering ($\sim D^2$ for diameters between 0.1 and 1 micron and $\sim D^4$ for diameters <0.1 micron, with D diameter of the particles). Because of the steep decrease in signal amplitude, ultrafine particles are not distinguished from the noise any more.

SUDOL S ET AL: "Quick and easy measurement of particle size of Brownian particles and planktons in water using a self-mixing laser", OPTICS EXPRESS, val. 14, no. 3, 6 Feb. 2006 (2006 Feb. 6), pages 1044-1054, XP002753399, DOI: 10.1364/OE.14.001 044 describes a method for quickly and easily measuring the size of small particles in suspensions. This method uses a self-mixing laser Doppler measurement with a laser-diode-pumped, thin-slice $LiNdP_4O_{12}$ laser with extremely high optical sensitivity.

SUMMARY OF THE INVENTION

It is an object of the present invention to provide a simple and cheap laser sensor module for ultra-fine particle size detection. The invention is defined by the independent claims. The dependent claims define advantageous embodiments.

According to a first aspect a laser sensor module for detecting ultra-fine particles with a particle size of 300 nm or less, more preferably 200 nm or less, most preferably 100 nm or less is provided. The laser sensor module comprises:
at least one laser which is adapted to emit laser light to at least one focus region in reaction to signals provided by at least one electrical driver,
at least one detector which is adapted to determine a self-mixing interference signal of an optical wave within a laser cavity of the at least one laser, wherein the self-mixing interference signal is caused by reflected laser light reentering the laser cavity, the reflected laser light being reflected by a particle receiving at least a part of the laser light,
the laser sensor module is arranged to perform at least one self-mixing interference measurement,
the laser sensor module being adapted to determine a first particle size distribution function with a first sensitivity by means of at least one measurement result determined based on the at least one self-mixing interference measurement, the laser sensor module being further adapted to determine a second particle size distribution function with a second sensitivity, the second sensitivity being different from the first sensitivity,
the at least one evaluator being adapted to determine a particle measure of the particle size of 300 nm or less by subtracting the second particle size distribution function multiplied with a calibration factor q from the first particle size distribution function.

The second sensitivity may be chosen such that particles smaller than a defined threshold particle size are not detected. The first sensitivity may be chosen such that particles smaller than the defined threshold particle size are detected. The first and the second particle size distribution functions have essentially an identical shape above the defined threshold particle size. The size of the signals scales with the sensitivity. It is therefore possible to determine the particle measure of particle size smaller than the defined threshold by subtracting the second particle size distribution function multiplied with the constant calibration factor q which is bigger than 1 in this case from the first particle size distribution function. Effects caused by the bigger particles which may mask signals of the smaller particles may be eliminated by means of the subtraction taking into account the calibration factor q. the same procedure may be used if the first sensitivity is lower than a second sensitivity meaning that the first particle size distribution function does not show any signals related to particles smaller than the defined threshold. The calibration factor q would in this case be smaller than 1. The chosen threshold particle size may be 300 nm, 200 nm, 100 nm or even 50 nm. The calibration factor q is determined in such a way that the effect of the larger particles is optimally cancelled. Current model calculations results indicate that the calibration factor q value is independent on the particle size distribution. The ratio of detected particles from a certain size seems to be given by the two measurement conditions, so not by the particle distribution. Anyhow, even in case that the particle distribution would require different q values for different ranges of particle sizes, there is a method to correct for this in this measurement as well. Derive the number of ultrafine particles (particles smaller than the defined threshold) regularly by a-qb, wherein a represents first particle size distribution and b represents the second particle size distribution function. The ratio (a-qb)/a can be derived in a subsequent step. This ratio would be a measure for the relative contribution of the small particles. Finally, q could be corrected for the particle distribution if necessary.

The at least one laser may, for example, be a semiconductor laser as side emitter or Vertical Cavity Surface Emitting Laser (VCSEL). The detector may be any sensor arrangement being arranged to determine variations of an optical wave in a laser cavity of the at least one laser in order to determine the self-mixing interference signal which is generated by means of laser light emitted by the laser, reflected by a particle and re-entering the laser cavity during operation of the at least one laser. The detector may, for example, be a photodiode which may be integrated in the VCSEL or a measurement circuit being arranged to determine an electrical resistance across the laser cavity. The at least one laser may be a single laser or a laser array such as an VCSEL array with two, three, four or more lasers integrated on one optical semiconductor chip.

The particle measure may refer to an absolute number of particles, a particle density with respect to a reference volume, a mass concentration with respect to a reference volume, any kind of graphical presentation of a particle distribution or density or a related acoustic signal.

The particles may be carried by means of a fluid. The fluid may be, for example, a liquid like water or a gas like air.

One self-mixing interference measurement may be sufficient in order to determine the first and the second particle size distribution function. The laser sensor module may in this case be adapted to determine the second particle size distribution function by means of the at least one measurement result determined based on the at least one self-mixing interference measurement.

The at least one evaluator may in this case be adapted to apply a first threshold to a measurement result determined based on the at least one self-mixing interference measurement. The at least one evaluator may in this case be further adapted to determine the first particle size distribution function by means of the measurement result and the first threshold. The at least one evaluator may in this case be further adapted to apply a second threshold to the measurement result determined based on the at least one self-mixing interference measurement, the second threshold being different from the first threshold. The at least one evaluator may in this case be further adapted to determine the second particle size distribution function by means of the measurement result and the second threshold. The second threshold may, for example, be higher than the first threshold such that the second particle size distribution function does not show any signals related to particles which are smaller at the predetermined particle threshold size as discussed above. The calibration factor q would in this case be bigger than 1 as discussed above. The detection threshold can for instance be set as an analogue detection threshold level which is set on a certain signal level. Measurement signals above this level are detected as particles. The level may be increased in order to get the second particle distribution function in case of q bigger than 1. Alternatively, after Fast Fourier Transformation (FFT) a threshold can be set based on the signal strength at a certain frequency corresponding with the respective particle size particle. Again, this threshold can be varied to obtain the two particle size distribution functions. The Signal to Noise Ratio (SNR) may alternatively or in addition be set once detected. The SNR detection threshold may be set to two different values. This can be done in the analogue or digital domain. One variant may be to determine SNR and set a required SNR level. Another option would be to use the same SNR threshold level but have different noise bandwidths. Both options could be performed in analogue or digital domain. Apart from looking in the time domain, one can also look in the frequency domain (of a short time interval), and set here a threshold value at different amplitude levels, or using different resolution bandwidths of FFT.

The measurement result determined based on the at least one self-mixing interference measurement may thus be manipulated at each stage of data processing in order to generate the first and the second particle size distribution function from one measurement result. The measurement result determined based on the one self-mixing interference measurement may be manipulated or filtered in a way that particles with a particle size below the predetermined particle size threshold do not contribute either to the first or the second particle size distribution function.

The laser sensor module may in an alternative approach be arranged to perform a first self-mixing interference measurement with the first sensitivity. The laser sensor module may in this case be further arranged to perform a second self-mixing interference measurement with the second sensitivity. The at least one evaluator being adapted to determine the first particle size distribution function by means of a first measurement result determined based on the first self-mixing interference measurement, the at least one evaluator may be further adapted to determine the second particle size distribution function by means of a second measurement result determined based on the second self-mixing interference measurement. The first self-mixing interference measurement may be performed by means of different measurement parameters (different sensitivities) than the second self-mixing interference measurement such that the first or the second particle size distribution function does not show any measurement signals related to particles smaller than the predetermined detection threshold. Alternatively, the measurement result based on the first or the second self-mixing interference measurement may be manipulated or filtered as described above.

The laser sensor module may comprise an optical device for focusing the laser light, the optical device being characterized by a numerical aperture of at least 0.06, more preferably at least 0.2, most preferably at least 0.3. The optical device may comprise one or more optical elements like one or more lenses.

Experiments have shown that the numerical aperture can be used to increase the sensitivity with respect to small especially ultrafine particles. A numerical aperture of 0.06 may enable detection of particles being smaller than 300 nm. A numerical aperture of 0.2 may enable detection of particles being smaller than 200 nm. A numerical aperture of 0.3 or bigger may enable detection of particles being smaller than 100 nm. The higher the numerical aperture of the optical device is the smaller the to be detected particles may be. It may thus be beneficial that the optical system or device of the laser sensor module described in one of the embodiments above or below has a high numerical aperture.

The particle sensor module may further comprise an optical redirection device which is arranged to move the focus region of the laser light. The particle sensor module may further comprise at least one controller which is adapted to control the movement of the focus region during the first self-mixing interference measurement with a first velocity and during the second self-mixing interference measurement with a second velocity different from the first velocity. The signal strength of the self-mixing interference signal depends on the size of the particles and the time the respective particle is illuminated by the laser light. The faster the movement of the focus region is the lower is the signal strengths. This means that particles with a size of, for example, 100 nm cannot be detected if the velocity of the movement of the focus region is above a predefined threshold. The measurement signal can in this case not be differentiated from the noise. The second sensitivity would therefore be lower if the second velocity would be faster than the first velocity. The calibration factor q would in this case bigger than 1. The calibration factor q would be smaller than 1 if the second velocity would be slower than the first velocity. The optical redirection device may be any optical device which is suited to increase the detection volume by moving the focus region. The movement may either be a continuous or discontinuous movement (step-by-step). The optical redirection device may, for example, be a movable mirror like a MEMS mirror, a galvanic mirror or the like. The controller may be any kind of processor, microprocessor or ASIC which can be used to control the optical redirection device in order to move the focus region. The controller may be combined with the electrical driver.

The particle sensor module with the optical redirection device may also be used to perform only one self-mixing interference measurement in order to determine the particle measure as described above. The movement of the focus region may be used to simulate a defined particle flow.

The particle sensor module may alternatively comprise at least one particle flow control device which is arranged to control a velocity of a particle flow. The particle sensor module further comprises at least one flow controller which is adapted to control the velocity of the particle flow by means of particle flow control device during the first self-mixing interference measurement with a first particle flow velocity and during the second self-mixing interference measurement with a second particle flow velocity different from the first particle flow velocity.

The particle flow control device may, for example, be a fan or a heater which is arranged to provide a defined velocity of a particle flow. The particles may be carried by a fluid. The velocity of the particle flow may be determined by means of a velocity of the fluid. The flow controller may be any kind of processor, microprocessor or ASIC which can be used to control the particle flow control device. The flow controller may be combined with the electrical driver. The flow controller may be arranged to control the velocity of the particle flow by means of the particle flow control device in two, three, four or more discrete steps or in a continuous way. The different velocities of the particle flow may be used to control the sensitivity of the particle sensor module as discussed above. Furthermore, a higher velocity of the particle flow increases the number of particles which are detected in a predefined time period. The calibration factor q decreases (in case of q>1) with increasing number of detected particles. The velocity of the particle flow (or alternatively the velocity of movement of the focus region by means of the redirection device as discussed above) may therefore be used to increase robustness of the particle sensor module by reducing the influence of the q factor. The overall sensitivity may be adapted by means of the SNR of the evaluator, the power of the emitted laser light, the sensitivity of the detector, the numerical aperture of the optical device and the like in order to determine the particle measure of the particle size of 300 nm or less.

The at least one electrical driver may in an additional or alternative embodiment be adapted to drive the at least one laser during the first self-mixing interference measurement with a first laser power and during the second self-mixing interference measurement with a second laser power different from the first laser power. The sensitivity of the laser sensor module can be further adapted by means of the optical power emitted by the at least one laser. The second self-mixing interference measurement is less sensitive if the second laser power is smaller than the first laser power. The calibration factor q would in this case bigger than 1. The calibration factor q would be smaller than 1 if the second laser power would be bigger than the first laser power. This technical measure can be combined with each other technical measure described above and below.

The particle sensor module may alternatively or in addition comprise at least one switchable optical attenuator. The at least one switchable optical attenuator may be adapted to provide a first optical attenuation to the laser light or reflected laser light during the first self-mixing interference measurement and a second optical attenuation to the laser light or reflected laser light during the second self-mixing interference measurement, the second optical attenuation being different from the first optical attenuation. The second self-mixing interference measurement is similar as in the case of lower laser power less sensitive if the second optical attenuation is higher than the first optical attenuation. The calibration factor q would in this case bigger than 1. The calibration factor q would be smaller than 1 if the second optical attenuation would be smaller than the first optical attenuation. The switchable optical attenuator may be arranged to attenuate the laser light emitted by the at least one laser in a discontinuous way (e.g. two different attenuation levels) or in a continuous way. The switchable optical attenuator may be controlled by means of the at least one electrical driver or by a separate attenuation controller comprising a respective processor, microprocessor or ASIC.

The particle sensor module may alternatively or in addition comprise at least one switchable optical device. The at least one switchable optical device may be adapted to provide a first numerical aperture during the first self-mixing interference measurement and a second numerical aperture during the second self-mixing interference measurement, the second numerical aperture being different from the first numerical aperture. The second self-mixing interference measurement would in this case be less sensitive if the second numerical aperture is smaller than the first numerical aperture. The calibration factor q would in this case be bigger than 1. The calibration factor q would be smaller than 1 if the second numerical aperture would be higher than the first numerical aperture. The switchable optical device may be arranged to change the numerical aperture in a discontinuous way (e.g. two different numerical apertures) or in a continuous way. The switchable optical device may be controlled by means of the at least one electrical driver or by a separate numerical aperture controller comprising a respective processor, microprocessor or ASIC. The switchable optical device may for example be a switchable aperture like an iris diaphragm.

The at least one detector may be adapted to provide a first detection threshold during the first self-mixing interference measurement and a second detection threshold during the second self-mixing interference measurement, the second detection threshold being different from the first detection threshold. The second self-mixing interference measurement would in this case be less sensitive if the second detection threshold is higher than the first detection threshold. The calibration factor q would in this case bigger than 1. The calibration factor q would be smaller than 1 if the second detection threshold would be smaller than the first numerical aperture. The detector may be arranged to change the detection threshold in a discontinuous way or in a continuous way. The detector may be controlled by means of the at least one electrical driver or by a separate detector controller comprising a respective process or, microprocessor or ASIC. The detection threshold may, for example, be changed by using two different detection principles. The detector may in this case comprise, for example, a photodiode to measure variations of the optical wave within the laser cavity or the laser cavities and in addition a detection circuit which is adapted to measure the resistance across the laser cavity or laser cavities.

The particle sensor module may in an alternative embodiment comprise:
  at least a first laser being adapted to emit first laser light to a first focus region in reaction to first signals provided by the at least one electrical driver,
  at least a second laser being adapted to emit second laser light to a second focus region in reaction to second signals provided by the at least one electrical driver, at least a one detector being adapted to determine the first and second self-mixing interference signal, at least one optical device, wherein the first laser light and the second laser light are emitted through the at least one optical device such that an aberration level of the first laser light in the first focus region is different than an aberration level of the second laser light in the second focus region.

The first laser light and the second laser light may be emitted through one optical device wherein the first laser light is emitted on an optical axis of the optical device, and wherein the second laser light is emitted parallel to the optical axis (e.g. 40 μm off axis). The aberration level of the first laser light in a first focus region may be near to zero such that highest sensitivity with respect to detection of ultra fine particles is enabled. The aberration level of the second laser light which is emitted off axis is different such that sensitivity with respect to detection of ultra fine particles is decreased. This arrangement may enable a calibration factor q which is near to one. The probability of systematic errors caused by a non-optimum calibration factor q may be reduced. Emitting the first laser light on axis is not mandatory. The first and the second laser light may both be emitted off axis depending on the configuration of the at least one optical device. Alternatively, it may also be possible that the first and the second laser light enclose an angle in order to provide focus regions with different aberration levels. There may be two optical devices, one for each laser beam emitted by the first and the second laser. There may be one common detector (e.g. photo diode) for each laser or two separate detectors (e.g. photo diodes).

The laser sensor module may in an alternative embodiment comprise:
at least a first laser being adapted to emit first laser light to a first focus region in reaction to first signals provided by the at least one electrical driver,
at least a first detector being adapted to determine the first self-mixing interference signal,
at least a second laser being adapted to emit second laser light to a second focus region in reaction to second signals provided by the at least one electrical driver,
at least a second detector being adapted to determine the second self-mixing interference signal.

The sensitivities of the first laser/detector arrangement and the second laser/detector arrangement with respect to small especially ultrafine particles can be adapted as described above but with static devices or elements. The laser power, the optical attenuation, the numerical aperture, the sensitivity of the detector, thresholds applied to the measurement signals etc. may be different but fixed (e.g. two different levels). There may be one electrical driver for driving both lasers or two independent electrical drivers. Optionally, each of the lasers may be combined with a switchable mirror in order to move the respective focus regions with different velocities. The calibration factor q is determined by means of the calibration procedure in order to essentially eliminate signals related to particles with a particle size above a predefined particle size threshold. The first laser may, for example, be optically coupled to a first optical device with a first numerical aperture. The second laser may, for example, be optically coupled to a second optical device with a second numerical aperture being different from the first numerical aperture. The calibration factor q may be either bigger than 1 or smaller than 1 depending on the relation between the first and second numerical aperture as described above. The at least one first laser and the at least one second laser may be single lasers or laser arrays comprising two, three, four or more lasers.

The particle sensor module may in addition to the self-mixing laser sensor for determining the self-mixing interference signal comprise a particle detection unit. The particle detection unit may be adapted to determine the second particle size distribution function. The particle detection unit may be arranged to determine the second particle size distribution function by means of a light source (e.g. LED) and a photodetector. The photodetector may be either arranged to determine light which is emitted by the light source and scattered by the particles or alternatively the reduction of the intensity of the light emitted by the light source which may be caused by particles passing a detection volume between the light source and the photodetector. The particle detection unit may be less sensitive with respect to small especially ultrafine particles. The calibration factor q would therefore be usually bigger than 1.

An air purifier, a sensor box or a wearable device may comprise the particle sensor module according to any embodiment as described above. The sensor box may be a particle sensor as described above or a device comprising several mutually different sensor modules or sensors. The wearable device may, for example, be a mobile communication device as a smart phone.

According to a second aspect a method for detecting ultra-fine particles with a particle size of 300 nm or less, more preferably 200 nm or less most preferably 100 nm or less is provided. The method comprises the steps of:
emitting laser light to at least one focus region,
determine at least one self-mixing interference signal,
determining a first particle size distribution function with a first sensitivity by means of at least one measurement result determined based on the at least one self-mixing interference measurement,
determining a second particle size distribution function with a second sensitivity, the second sensitivity being different from the first sensitivity,
determining a particle measure of the particle size of 300 nm or less by subtracting the second particle size distribution function multiplied with a calibration factor q from the first particle size distribution function.

The method steps are not necessarily performed in the sequence described above.

The method may comprise the additional steps of:
applying a first threshold to a measurement result determined based on the at least one self-mixing interference measurement in order to determine the first particle size distribution function,
applying a second threshold to the measurement result determined based on the at least one self-mixing interference measurement in order to determine the second particle size distribution function, the second threshold being different from the first threshold.

According to a third aspect a computer program product is presented. The computer program product comprises code means which can be saved on at least one memory device of the laser sensor module according to any one of claims 1 to 11 or on at least one memory device of a device comprising the laser sensor module. The code means being arranged such that the method according to claim 13 or 14 can be executed by means of at least one processing device of the laser sensor module according to any one of claims 1 to 11 or by means of at least one processing device of the device comprising the laser sensor module.

The memory device or the processing device may be comprised by the laser sensor module (e.g. electrical driver, evaluator etc.) or the device comprising the laser sensor module. A first memory device and/or first processing device of the device comprising the laser sensor module may interact with a second memory device and/or second processing device comprised by the laser sensor module.

The memory device or devices may be any physical device being arranged to store information especially digital information. The memory device may be especially selected out of the group solid-state memory or optical memory.

The processing device or devices may be any physical device being arranged to perform data processing especially processing of digital data. The processing device may be especially selected out of the group processor, microprocessor or application-specific integrated circuit (ASIC).

It shall be understood that the laser sensor module according to any one of claims 1 to 11 and the method of claim 13 or 14 have similar and/or identical embodiments, in particular, as defined in the dependent claims.

It shall be understood that a preferred embodiment of the invention can also be any combination of the dependent claims with the respective independent claim.

Further advantageous embodiments are defined below.

These and other aspects of the invention will be apparent from and elucidated with reference to the embodiments described hereinafter.

DETAILED DESCRIPTION OF EMBODIMENTS

Figure 1:
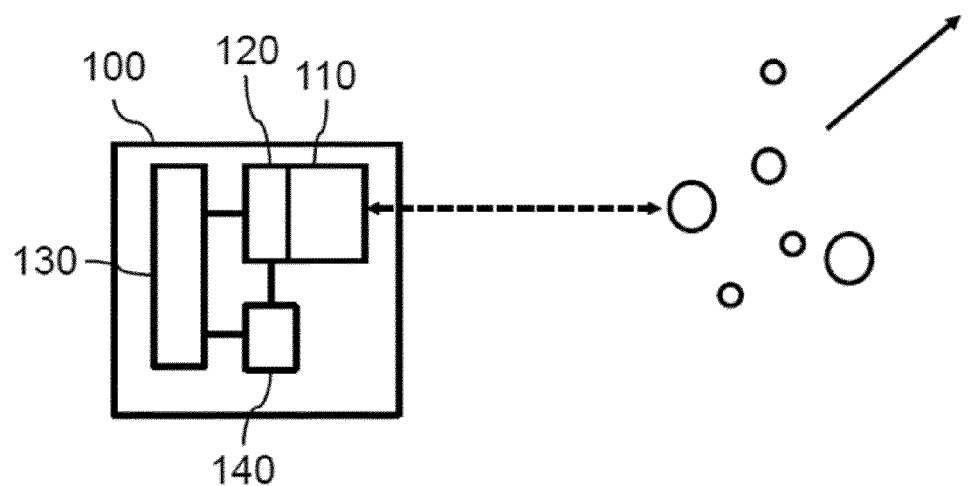
FIG. 1 shows a principal sketch of a first laser sensor module

Various embodiments of the invention will now be described by means of the Figures.

Self-mixing interference is used for detecting movement of and distance to an object. Background information about self-mixing interference is described in "Laser diode self-mixing technique for sensing applications", Giuliani, G.; Norgia, M.; Donati, S. & Bosch, T., Laser diode self-mixing technique for sensing applications, Journal of Optics A: Pure and Applied Optics, 2002, 4, S. 283-S. 294 which is incorporated by reference. Detection of movement of a fingertip relative to a sensor in an optical input device is described in detail in International Patent Application No. WO 02/37410. The disclosure regarding the detection of distance and movement in International Patent Application No. WO 02/37410 is incorporated by reference.

The principle of self-mixing interference is discussed based on the examples presented in International Patent Application No. WO 02/37410. A diode laser having a laser cavity is provided for emitting a laser, or measuring, beam. At its upper side, the device is provided with a transparent window across which an object, for example a human finger, is moved. A lens, for example, a plano-convex lens is arranged between the diode laser and the window. This lens focuses the laser beam at or near the upper side of the transparent window. If an object is present at this position, it scatters the measuring beam. A part of the radiation of the measuring beam is scattered in the direction of the illumination beam and this part is converged by the lens on the emitting surface of the laser diode and re-enters the cavity of this laser. The radiation re-entering the cavity of the diode laser induces a variation in the gain of the laser and thus in the intensity of radiation emitted by the laser, and it is this phenomenon which is termed the self-mixing effect in a diode laser.

The change in intensity of the radiation emitted by the laser can be detected by a photo diode, provided for this purpose, which diode converts the radiation variation into an electric signal, and electronic circuitry is provided for processing this electric signal.

Movement of the object relative to the measuring beam causes the radiation reflected thereby to undergo a Doppler shift. This means that the frequency of this radiation changes or that a frequency shift occurs. This frequency shift is dependent on the velocity with which the object moves and is of the order of a few kHz to MHz. The frequency-shifted radiation re-entering the laser cavity interferes with the optical wave, or radiation generated in this cavity, i.e. a self-mixing effect occurs in this cavity. Dependent on the phase shift between the optical wave and the radiation re-entering the cavity, the interference will be constructive or negative, i.e. the intensity of the laser radiation is increased or decreased periodically. The frequency of the laser radiation modulation generated in this way is exactly equal to the difference between the frequency of the optical wave in the cavity and that of the Doppler-shifted radiation re-entering the cavity. The frequency difference is of the order of a few kHz to MHz and thus easy to detect. The combination of the self-mixing effect and the Doppler shift causes a variation in behavior of the laser cavity; especially its gain or light amplification varies. The impedance of the laser cavity or the intensity of the radiation emitted by the laser may, for example, be measured, and not only can the amount of movement of the object relative to the sensor (i.e. distance traveled) be evaluated, but the direction of movement can also be determined, as described in detail in International Patent Application No. WO 02/37410.

The self-mixing interference signal may in case of particle detection, for example, be characterized by a short signal burst or a number of signal bursts. It may therefore be preferred to use a DC drive current in order to simplify signal detection and signal analysis. Alternatively or in addition, a modulated drive current may be used in order to determine the position and/or velocity of the particle, for example, by means of self-mixing interference signals which may be generated by reflection of laser light at bigger particles as described above. The distance and/or velocity may be determined within one measurement or in a subsequent measurement step. It may therefore be possible or even beneficial to use a DC drive current in a first period in time in order to generate a particle measure of the intended particle size and a modulated drive current in order to determine the distance and/or velocity of the particle flow.

FIG. 1 shows a principal sketch of a first laser sensor module 100. The first laser sensor module comprises a laser 110 with an integrated detector 120. The integrated detector 120 is an integrated photodiode which is part of the layer structure of the laser 110. The integrated photodiode determines oscillations of the optical wave within the laser cavity of the laser 110. The first laser sensor module 100 further comprises an electrical driver 130 and an evaluator 140. The evaluator 140 is connected to the laser 110 or more precisely the detector 120 and the electrical driver 130. The electrical driver 130 supplies electrical power to the laser 110 in order to emit laser light. The laser 110 is in this case a Vertical Cavity Surface Emitting Laser (VCSEL) with integrated photodiode. The laser sensor module 100 is connected to a power supply (not shown) which provides the power which is DC or modulated and supplied by means of the electrical driver 130. The electrical driver 130 is arranged to provide different modulation schemes to the laser 110. A self-mixing interference signal is generated if the laser light emitted by the laser 110 is reflected by particles passing a focus region of the laser light. The particles preferably move with an essentially constant flow velocity. The defined flow may be generated either by a heating element (not shown) being arranged to heat the fluid (in this case air) carrying the particles or a fan (not shown). The heating element or fan and corresponding fluid channels (not shown) may be part of a particle sensor (not shown) comprising the first laser sensor module 100 or part of a device comprising the particle sensor module 100. The arrow indicates a direction of movement or flow of the particles. The flow velocity may be either predetermined or may be measured by means of a separate flow sensor (not shown) or by means of a corresponding self-mixing interference measurement procedure performed by means of the laser sensor module 100 as described above. The flow velocity may be used by means of the evaluator 140 in order to determine, for example, the particle density. The evaluator 140 is in this case arranged to apply different signal-to-noise ratios to the self-mixing interference signal which is generated by means of laser light reflected by a multitude of particles within a predetermined time period.

Figure 2:
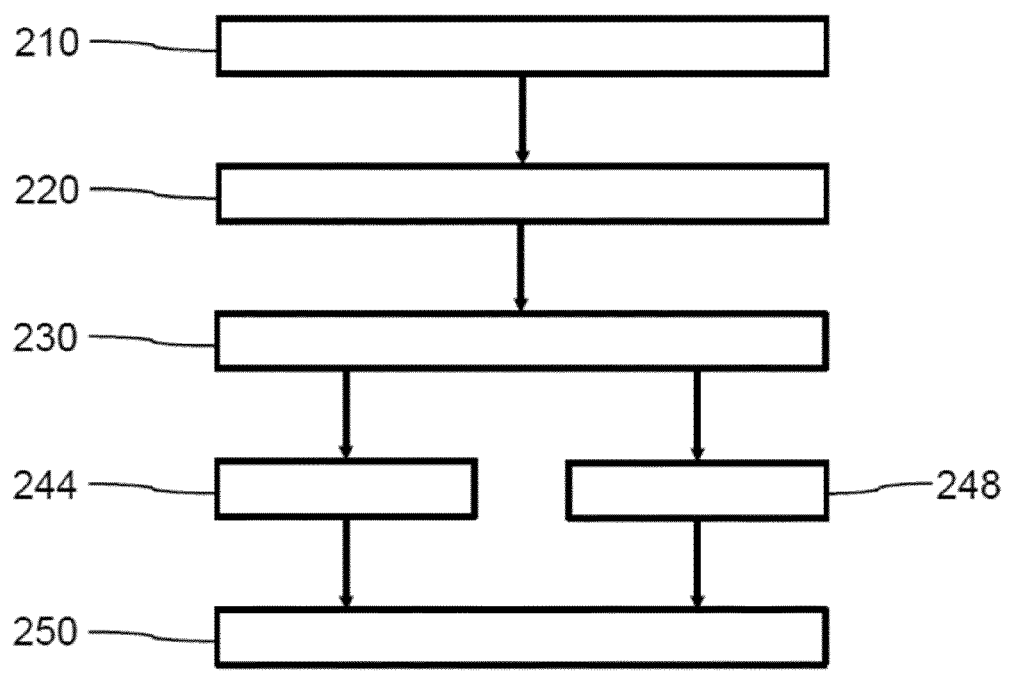
FIG. 2 shows a principal sketch of a detection algorithm

FIG. 2 shows a principal sketch of a corresponding detection algorithm. In step 210 is a self-mixing interference signal generated by means of detector 120 based on variations of the optical wave in the laser cavity of the laser 110. The self-mixing interference signal is digitized in step 220 and in step 230 two different detection thresholds are determined by means of evaluator 140. The detection thresholds correspond to two different signal-to-noise ratios wherein a second of the signal-to-noise ratios (corresponding to the second threshold) is determined such that particles with a particle size of e.g. less than 150 nm do not generate a self-mixing interference signal which can be differentiated by means of evaluator 140 from background noise. The self-mixing interference signal is processed by means of evaluator 140 in step 244 in order to determine a number of particles or more precise the first particle distribution function at the first threshold. The same self-mixing interference signal is further processed by means of evaluator 140 in step 248 in order to determine a number of particles or more precise the second particle distribution function at the second threshold. The second particle distribution function is multiplied with calibration factor q and subtracted from the first particle distribution function in order to determine a measure for the number of ultrafine particles with the particle size of less than 150 nm within a reference volume (e.g. $m^3$) in step 250.

Figure 3:
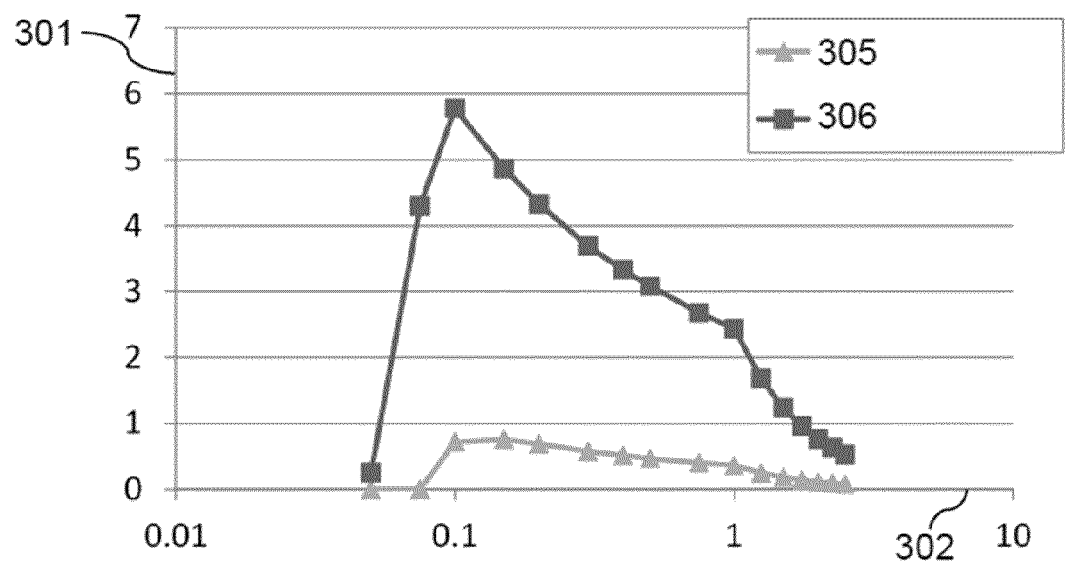
FIG. 3 shows a first graph showing detected number of particles as a function of particle size
Figure 4:
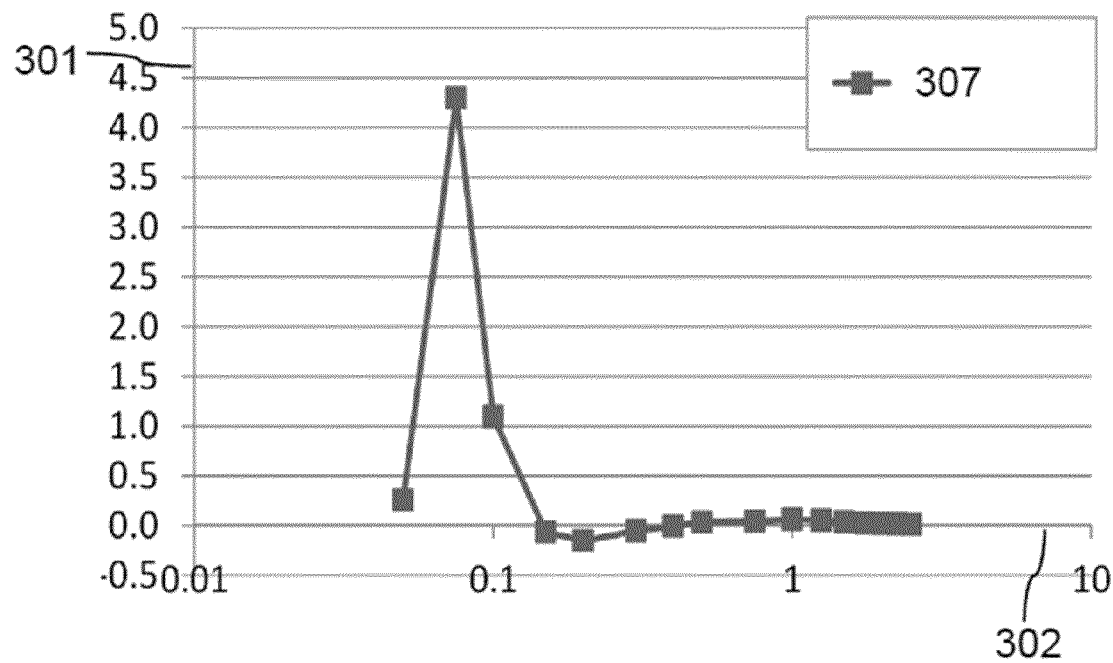
FIG. 4 shows a first sensitivity curve of an embodiment of the laser sensor module and the corresponding method

FIG. 3 shows a first graph showing measurement results generated by means of the laser sensor module 100. The abscissa 302 shows the particle size determined by means of the diameter (μm) of the particles. The ordinate 301 shows the number of detected particles in counts per $\mu g/m^3$. Curves 305, 306 show the detected number of particles as a function of particle size. Both curves 305, 306 are measured with a numerical aperture of 0.5. The first curve 305 is measured with a signal-to-noise ratio of 25. The second curve 306 is measured with a signal-to-noise ratio (SNR) of 6. Basically, both curves show identical shapes, except for the smallest particle sizes. The SNR value of 25 is not reached any more for these particles, while with a detection threshold corresponding to SNR=6 these small particles still are observed. So by subtracting q times the curve with SNR=25 from the curve with SNR=6, a first sensitivity curve 307 in FIG. 4 is obtained. For this situation the calibration factor was q=6.5. The first sensitivity curve 307 shows that the signals slightly above 100 nm can be eliminated and the number or mass concentration of ultrafine particles with a particle size of less than 100 nm can be determined. The calculations on the number of detected particles have been performed for a velocity of the focus region or particle flow of 7 m/s.

Figure 5:
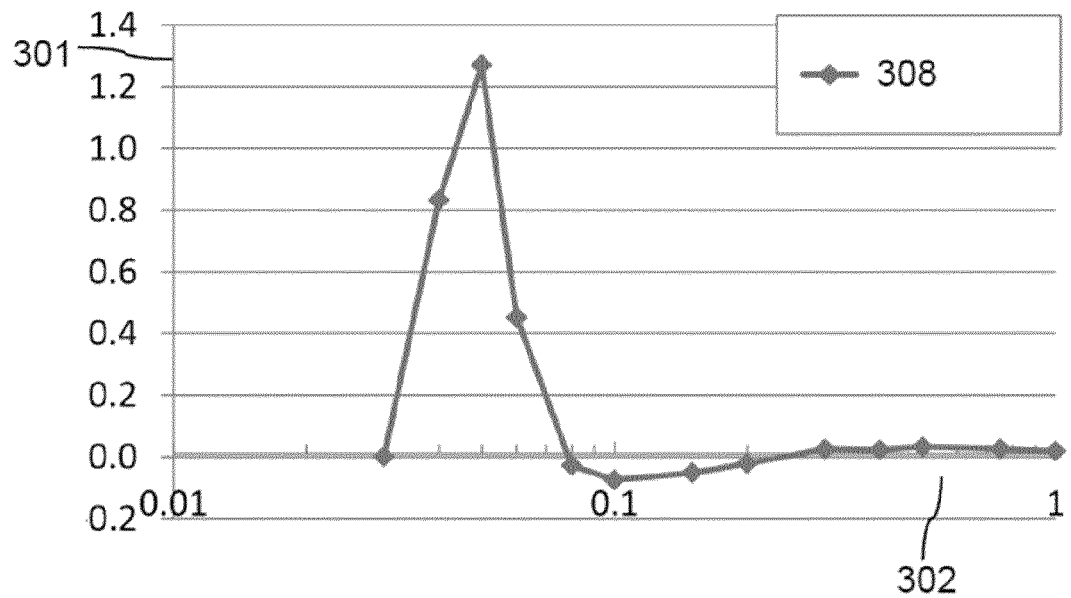
FIG. 5 shows a second sensitivity curve of an embodiment of the laser sensor module and the corresponding method

FIG. 5 shows a second sensitivity curve of an embodiment of the laser sensor module 100 and the corresponding method. The laser sensor module 100 was optimized in order to detect particles with a size of 50 nm. Current experience is that for laser sensor modules 100 measuring the particle counts as a function of particle size a good correlation with the model is obtained. Furthermore, a good correlation could be shown between particle counts measured by means of self-mixing interference signals and particle concentration determined by means professional equipment (Grimm 11-R). The numerical aperture (NA) has been enlarged in this embodiment to NA=0.6 and the measurement velocity is 1 m/s in order to get good sensitivity for particles with a particle size of around 50 nm. In this case SNR 24 and SNR 6 were used in the same way as shown in FIG. 4 and discussed above. The calibration factor q was in this case 6.2.

Figure 6:
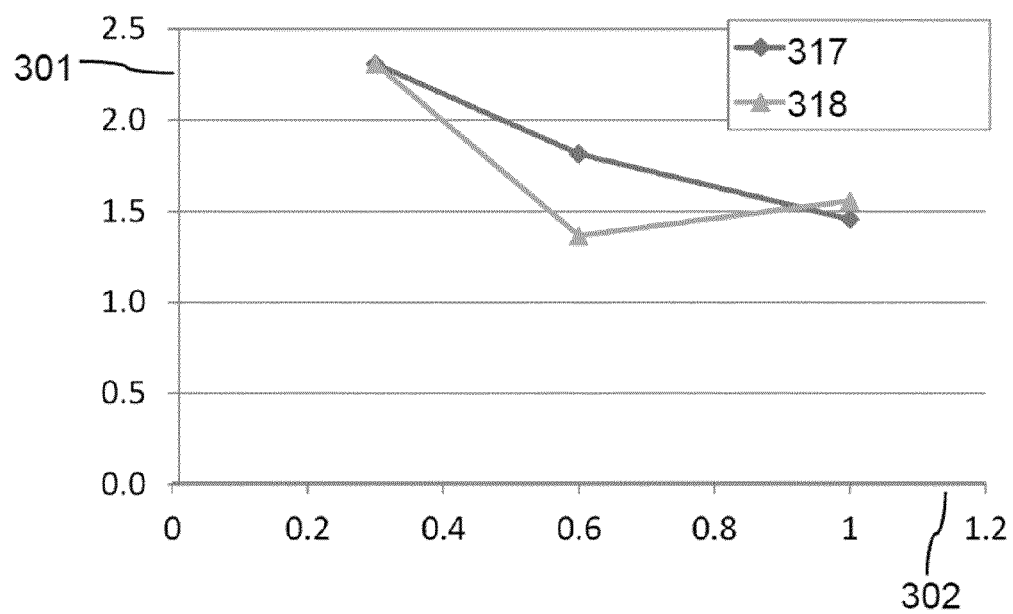
FIG. 6 shows a first comparison of measurement meant data and simulated data

The graph shown in FIG. 6 shows in line 318 the number of counts were obtained per ug/$m^3$ measured as a function of particle size an SMI device with relative small NA of NA=0.1. The measurements were limited to particle sizes of bigger than 300 nm because of the limitations with this low NA and the limitations of the professional device (around 250 nm). Line 317 shows simulated data which were obtained by applying the method described above and below. Also in these model calculations a numerical aperture of 0.1 is used. The comparison of measurement data and simulated data shows a good match of the behavior as a function of particle size for the model and the experiment.

Figure 7:
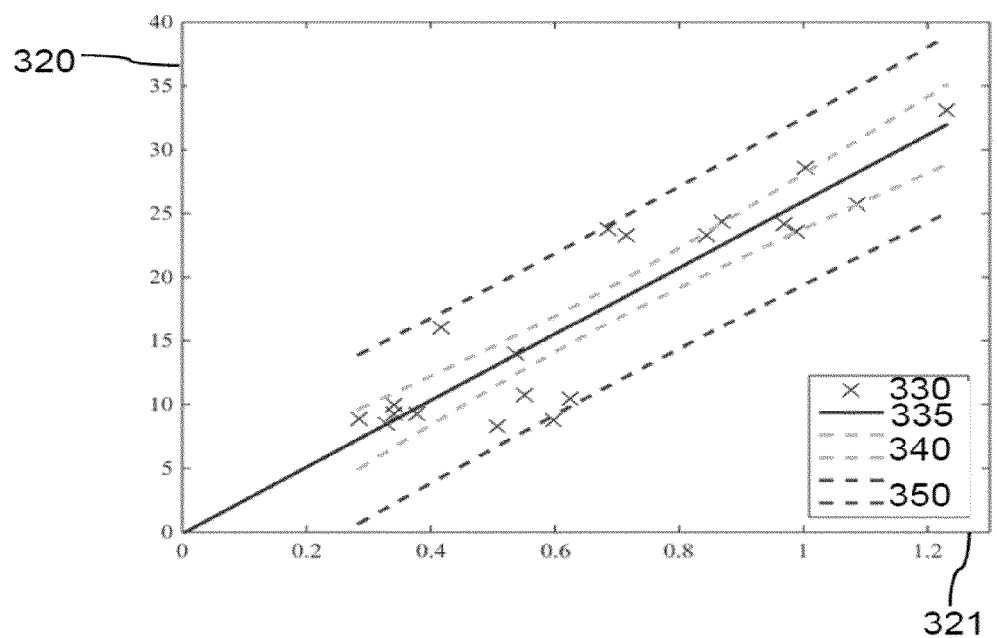
FIG. 7 shows a second comparison of measurement meant data in comparison with professional equipment.

FIG. 7 shows correlation plots of measurement data 330 determined by means of the professional equipment and as measured at the same time using the SMI device with NA=0.1. The ordinate 320 shows the PM 2.5 value in μg/m³ determined by means of the professional equipment and the abscissa 321 shows the particle count rate (#/s) determined by means of a laser sensor module 100. The fit can be described by the linear equation

*PM*2.5=26.07*(particle count rate)−0.12106.

Excellent correlation between both measurements methods is observed. The two 90% CI lines 340 show the interval where with 90% certainty of the fitted data. The two 90% PI lines 350 show the interval where with 90% certainty an individual measurement lies. This excellent correlation further confirms robustness of elimination of signals related to the detection of bigger particles as discussed above and below. FIGS. 6 and 7 further show that the laser sensor module 100 and the corresponding method can also be used for the detection of particles with a size of bigger than 300 nm. The laser sensor module 100 may therefore also be used to determine small particles or more precise concentration of small particles within a volume with a size of less than 2500 nm (2.5 μm), 1500 nm (1.5 μm) or 1000 nm (1 μm).

Figure 8:
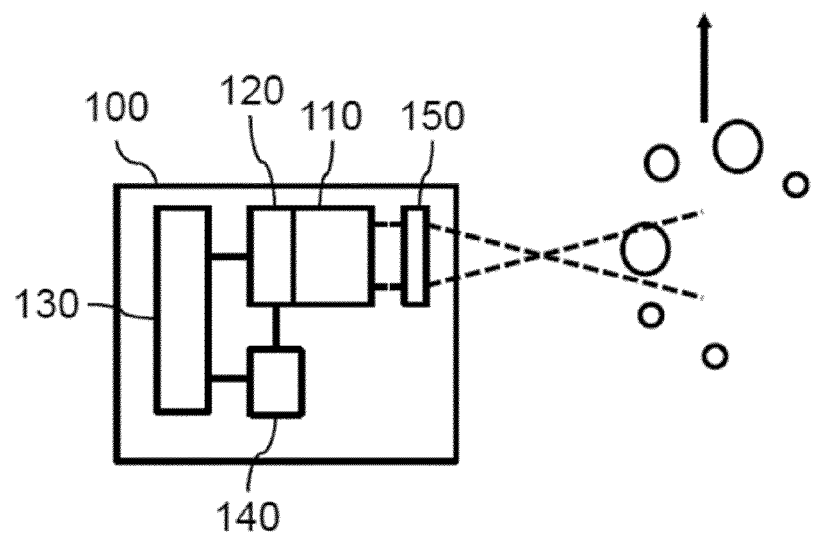
FIG. 8 shows a principal sketch of a second laser sensor module

FIG. 8 shows a principal sketch of a second laser sensor module 100. The second laser sensor module comprises a laser 110 with an integrated detector 120. The integrated detector 120 is an integrated photodiode which is part of the layer structure of the laser 110. The second laser sensor module 100 further comprises an electrical driver 130, and evaluator 140 and an optical device 150. The evaluator 140 is connected to the laser 110 or more precisely the detector 120 and the electrical driver 130. The electrical driver 130 supplies electrical power to the first laser 110 in order to emit laser light. The laser 110 is in this case a vertical cavity surface emitting laser (VCSEL) with integrated photodiode. The laser sensor module 100 is connected to a power supply (not shown) which provides the power which is modulated and supplied by means of the electrical driver 130. The optical device 150 is arranged to provide a high numerical aperture (NA) of 0.6 in order to enable measurements of ultrafine particles with a particle diameter of around 50 nm as discussed with respect to FIG. 5. The electrical driver 130 is in this case further adapted to provide at least two different power levels to laser 110. It is therefore further possible to determine a first particle size distribution function at a first laser power based on a first self-mixing interference signal and a second particle size distribution function at a second different laser power based on a second self-mixing interference signal. The evaluator 140 is adapted to determine the corresponding calibration factor q in a memory device in order to calculate the particle measure based on the first and second particle size distribution function as discussed above.

Figure 9:
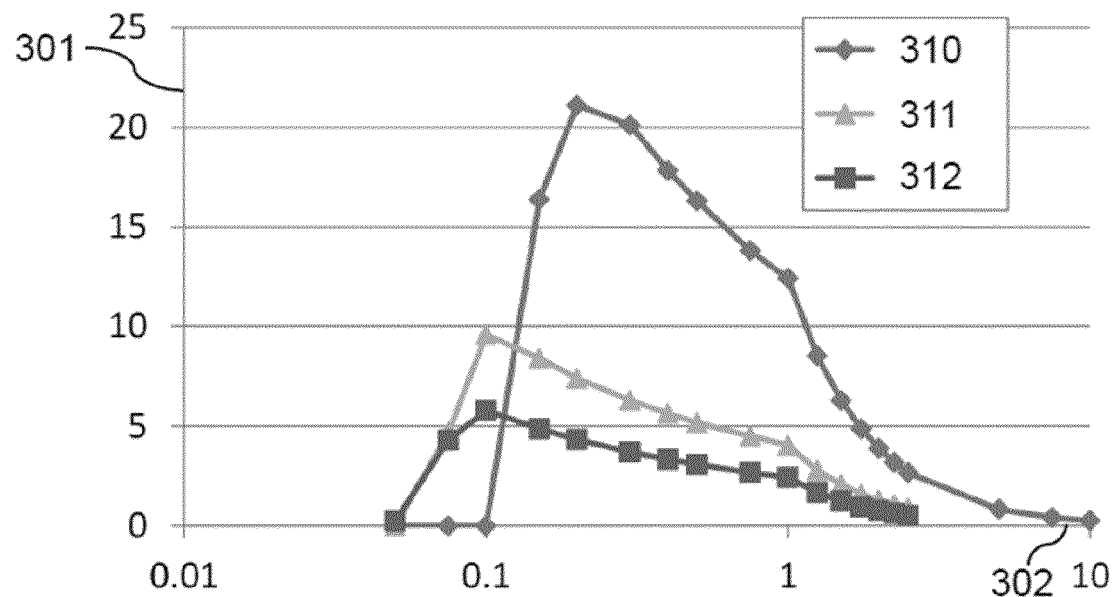
FIG. 9 shows a second graph showing detected number of particles as a function of particle size
Figure 11:
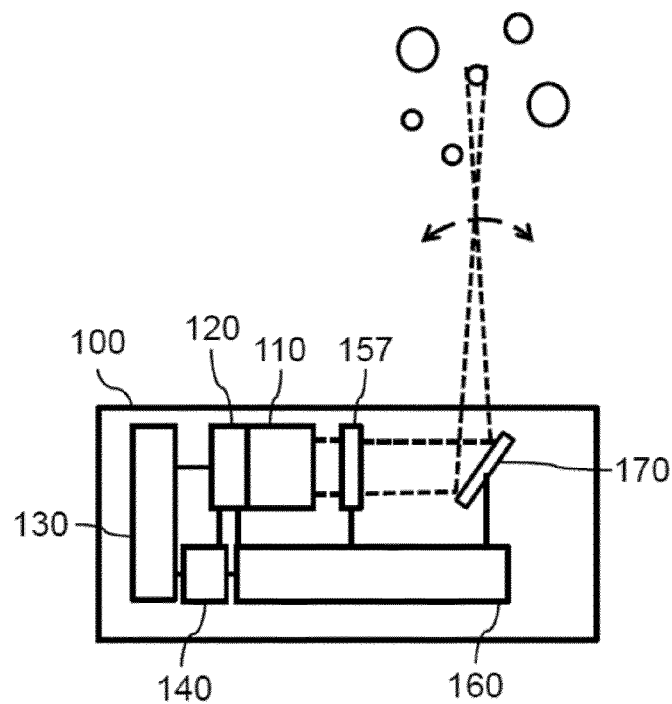
FIG. 11 shows a principal sketch of a fourth laser sensor module

FIG. 9 shows a second graph similar as FIG. 3 showing model calculations of particles as a function of particle size. The curves 310, 311, 312 show measurement results generated by means of a laser sensor module 100 with a movable mirror 170 as depicted in FIG. 11. The movable mirror was arranged such that the focus region of the laser light emitted by a laser 110 moves with a velocity of 7 m/s. Alternatively, a fluid flow could be provided with the same velocity, for example, by means of a fan. Curve 310 shows a particle size distribution function generated by means of an optical device 150 with a numerical aperture of 0.1. Curve 311 shows a particle size distribution function generated by means of an optical device 150 with a numerical aperture of 0.3. Curve 312 shows a particle size distribution function generated by means of an optical device 150 with a numerical aperture of 0.5. The curves 310, 311, 312 show that the sensitivity with respect to smaller particles increases with increasing numerical aperture. The numerical aperture is not the only parameter which can be adapted in order to increase sensitivity especially for ultrafine particles. The velocity of the flow (or alternatively the movement of the focus region by means of movable mirror 170) is a further parameter in order to increase sensitivity by using a relatively slow velocity of e.g. 1 m/s as discussed with respect to FIG. 5 above.

Figure 10:
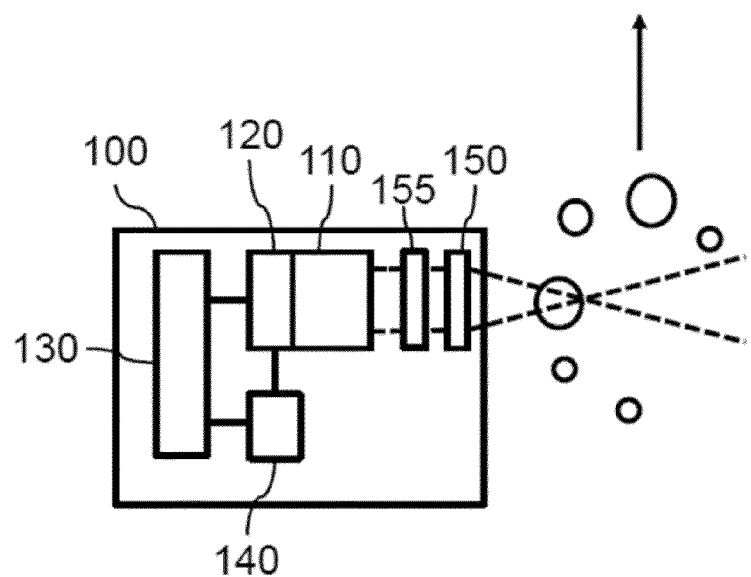
FIG. 10 shows a principal sketch of a third laser sensor module

FIG. 10 shows a principal sketch of a third laser sensor module 100. The third laser sensor module 100 is very similar to the second laser sensor module 100. The third laser sensor module 100 comprises in addition a switchable optical attenuator 155. The switchable optical attenuator 155 provides the first optical attenuation to the laser light emitted by laser 110 during generation of a first self-mixing interference signal and a second optical attenuation during generation of a second self-mixing interference signal. The laser sensor module 100 is in this case arranged to determine the particle measure of particles with in this case of particle size of less than 200 nm by subtracting a second particle size distribution function determined by means of the second self-mixing interference signal multiplied with the calibration factor q from a first particle size distribution function determined by means of the first self-mixing interference signal. The first optical attenuation is in this case higher than the second optical attenuation such that the calibration factor q is smaller than 1.

FIG. 11 shows a principal sketch of a fourth laser sensor module 100. The fourth laser sensor module comprises a laser 110 with an integrated detector 120. The fourth laser sensor module 100 further comprises an electrical driver 130, an evaluator 140, a switchable optical device 157, and optical redirection device arranged as movable mirror 170 and a controller 160 for controlling the movable mirror 170. The evaluator 140 is connected to the detector 120, the electrical driver 130 and the controller 160. The electrical driver 130 supplies electrical power to the laser 110 in order to emit laser light. The evaluator 140 receives electrical signals provided by the detector 120 which are caused by the self-mixing interference in the laser cavity of the laser 110 determined by means of detector 120. The evaluator 140 further receives information from the electrical driver 130 and the controller 160 in order to interpret the self-mixing interference signal measured by the first detector 120. The information provided by the electrical driver 130 may comprise information regarding the driving scheme provided to the laser 110. The information provided by controller 160 may comprise angular velocity, amplitude of mirror movement, phase of mirror movement, optionally hold time at different angles and the like. The evaluator 140 is enabled by means of this information to determine particle size distribution functions depending on, for example, the velocity or more precisely angular velocity of the movable mirror 170. The laser light emitted by the laser 110 is focused by means integrated lens (microlens bonded to laser 110) to a focus region which moves along a scanning direction during the oscillation of the movable mirror 170. A particle can be detected within a range around the focus region.

The SNR decreases for larger velocity of movable mirror 170 such that the sensitivity of the laser sensor module can be varied by means of the velocity of the movable mirror 170. Furthermore, the switchable optical device 157 can be used to manipulate or change a numerical aperture of the fourth laser sensor module. In addition the laser power of laser 110 can be changed by means of electrical driver 130 for different detection periods. It is therefore possible to tune the sensitivity of the fourth laser sensor module 100 by means of different hardware parameters in addition to manipulation of filtering of the results of the self-mixing interference measurements which can be performed by means of evaluator 140. It is therefore possible to vary the sensitivity and the corresponding particle size distribution functions in a broad range. The evaluator 140 further comprises at least one memory device comprising a relation between the hardware parameters (mirror velocity, numerical aperture etc.), the evaluation parameters (e.g. SNR) applied by the evaluator 140 and the corresponding calibration factor q. The relation may be stored by means of functional dependence or in a table. It is noted that at larger air or fluid velocities more particles per second are detected due to the increased detection volume. This effectively means a reduction in q factor in case of q>1 (or generally speaking q is nearer to 1) for methods where the velocity is changed, either by a redirection device or by an external fan. Reduction in q factor may lead to a more robust system design because the systematic influence of the calibration factor q may be reduced.

Figure 12:
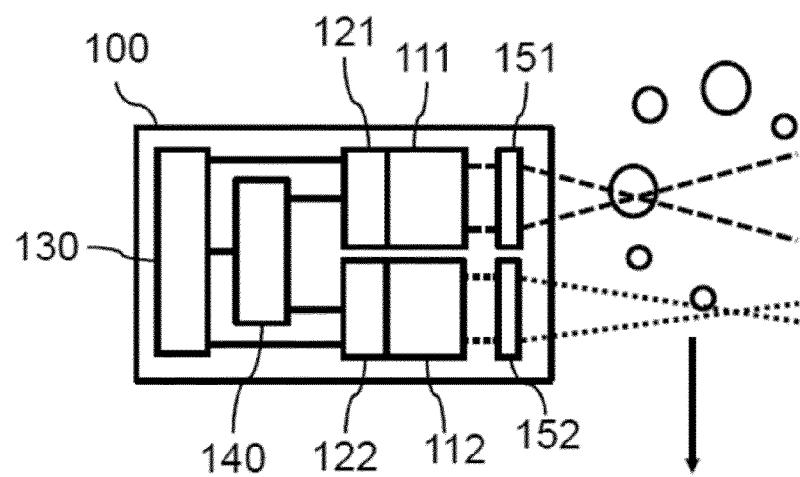
FIG. 12 shows a principal sketch of a fifth laser sensor module

FIG. 12 shows a principal sketch of a fifth laser sensor module 100. The fifth laser sensor module 100 comprises a first laser 111 with an integrated first detector 120 and a second laser 112 with an integrated second detector 122. The first laser 110 and the second laser 111 emit first and second laser light. The fifth laser sensor module 100 comprises an electrical driver 130 which is adapted to provide a drive current to the first laser 111 and to the second laser 112. The electrical driver comprises an evaluator 140 which is connected to the first laser 110 and the second laser 111. The fifth laser sensor module 100 further comprises a first optical device 151 with a first numerical aperture for focusing the first laser light to a first focus region. The fifth laser sensor module 100 further comprises a second optical device 152 with a second numerical aperture different from the first numerical aperture for focusing the second laser light to a second focus region. The first focus region does not overlap in this embodiment with the second focus region but may overlap in another embodiment. The evaluator 140 receives an electrical signals provided by the first detector 121 which are caused by the first self-mixing interference signal. The evaluator 140 further receives electrical signals provided by the second detector 122 which are caused by second self-mixing interference signal. The evaluator 140 further receives information from the electrical driver 130. The evaluator 140 is enabled by means of this information to determine a first and second particle size distribution function and the corresponding particle measure by means of an accordingly adapted calibration factor q as discussed above.

Figure 13:
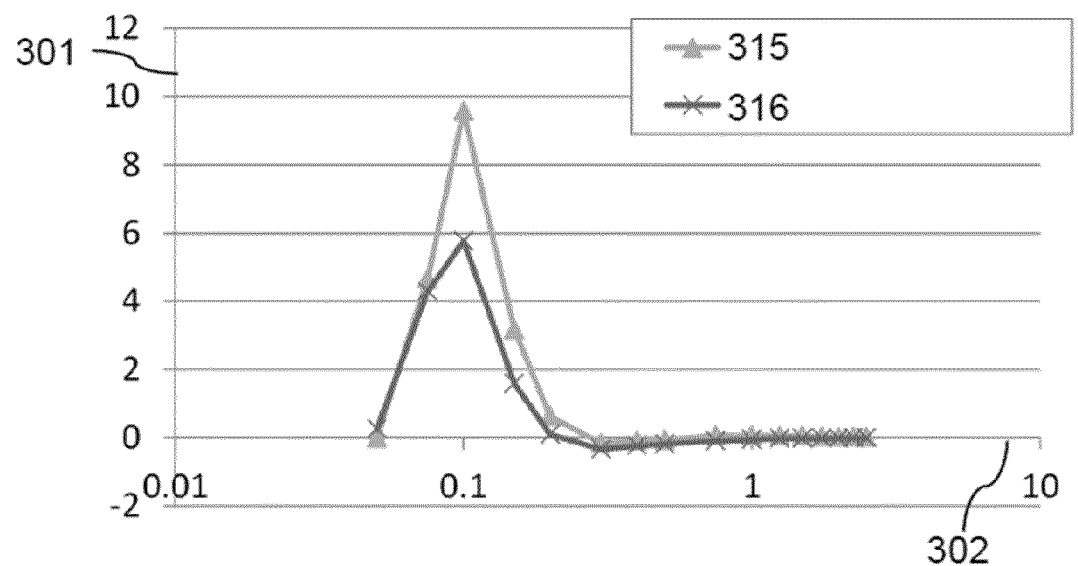
FIG. 13 shows a third sensitivity curve of an embodiment of the laser sensor module

FIG. 13 shows a third sensitivity curve of an embodiment of the laser sensor module 100 generated by means of two different setups of numerical apertures and therefore two different self-mixing interference signals. The laser sensor module 100 comprises in this case a movable mirror 170 similar as described above with respect to FIG. 11. Both simulations have been performed such that the focus region moves with the velocity of 7 m/s. A similar approach can be used if a fan moves the fluid with the particles with a corresponding velocity in combination with the fifth laser sensor module 100 discussed with respect to FIG. 12 with two different apertures. In the first measurement shown by curve 315 a first numerical aperture of 0.1 and a second numerical aperture of 0.3 is used. The calibration factor q is in this case 0.32. In the second measurement shown by curve 316 a first numerical aperture of 0.1 and a second numerical aperture of 0.5 is used. The calibration factor q is in this case 0.2. The combination of parameters can be used to get best match with results measured by professional equipment which is currently used to measure smaller especially ultrafine particles or to tune the detected UFP particle size to the region of interest.

Figure 14:
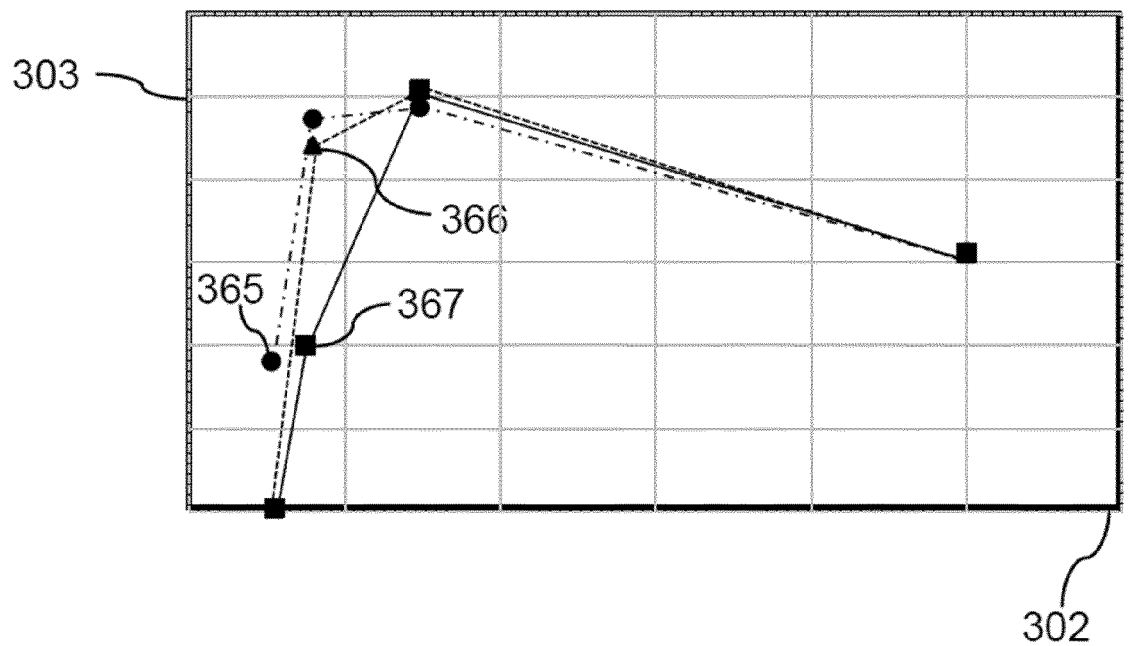
FIG. 14 shows sensitivity depending on aberration level

FIG. 14 shows sensitivity with respect to particle detection depending on aberration of the corresponding optical device. The abscissa 302 shows the particle size determined by means of the diameter (µm) of the particles. The ordinate 3031 shows the number of detected particles in counts per second per (µg/m$^3$) [#/s/(µg/m$^3$)]. Curves 365, 366 and 367 show simulations of the count rate as a function of aberration level of the spot or focus point of laser light emitted by the laser or lasers. All three curves 365, 366 and 367 are simulated with a numerical aperture of 0.5 and an emission wavelength of the laser of 850 nm. Curve 365 shows a simulated count rates at a aberration level of 0 mλ. Curve 366 shows a simulated count rates at an aberration level of 70 mλ. Curve 367 shows simulated count rates at an aberration level of 140 mλ. From the model calculations of the particle count rate with spot aberrations it is obvious that for small particles, being detected very close to the focus position or region, the number of detected particles is very sensitive for the aberration level of the focus region. For larger particles, being detected in a much larger area around the optimum focus region, the number of detected particles hardly change with aberration level. Comparing FIG. 14 with FIG. 3 shows a potential advantage of the variation of the aberration level in order to provide different sensitivities in two measurements in comparison to the approach discussed with respect to FIG. 3. The count rate of bigger particles was a particle size bigger than 0.15 µm is nearly identical. The q factor can therefore be very close to 1. This may reduce eventual errors in the measurement which may be caused by a non-optimum q factor (e.g. 6 instead of correct optimum q factor of 6.5). Furthermore, having one or more optical devices to adjust the aberration level in the focus region, this also means that the quality of the focus region or the spot can be optimized for the first measurement which is essentially without aberrations. This results in the smallest possible minimum detected particle size. Using different aberration levels in order to get to measurement results with different sensitivity with respect to ultra fine particles can be used in laser sensor modules with static focus region (see, for example, FIG. 1, FIG. 8 and FIG. 10) as well as in laser modules with dynamic or movable focus region (see, for example, FIG. 11). Alternatively, it is also possible to use two lasers and two different optical devices with different aberration levels (see, for example, FIG. 12) in order to enable simultaneous measurements with two different sensitivities. Several concrete embodiments using different aberration levels are discussed with respect to the following embodiments.

Embodiment 1: LC Cell

In a first embodiment a liquid crystal cell (LC) is used to adjust the aberration level of the focus region. For instance in FIG. 10, the optical attenuator 155 can be replaced by this LC cell. LC cells are devices in which aberrations actively can be introduced in the focus region or spot, which is required for this method. The same LC cell can be used to compensate or partly compensate other aberrations from the optical system. Doing so, the best performance is obtained on ultrafine particle count rate and minimum detected particle size at the first measurement.

Embodiment 2: Rotating Glass Plate

In a second embodiment the tilt of a glass plate is used to vary the aberration level. For instance a cover glass (not shown) in FIG. 8 can be mounted in the measurement path of the optical device 150 such that it can be rotated around an axis essentially perpendicular to an optical axis of the measurement being. This will introduce especially astigmatism. Also the same plate can be used to optimize the astigmatism of the spot to a minimum value in the first measurement.

Embodiment 3: Removing/Inserting a Glass Plate

In this embodiment the optical system is optimally aligned with a glass plate inserted for instance after the optical device 150 in FIG. 8. Removing the glass plate will introduce aberrations for the second measurement. The optical system can also be optimized without glass plate and by inserting a glass plate the aberrations are introduced. These aberrations may come from the thickness of the glass plate itself (especially spherical aberration) or from a combination with tilt of the glass plate (yielding mainly a combination of spherical aberration and astigmatism).

Embodiment 4: Deformable Mirror

Aberration may be influenced in the laser sensor module by a deformable mirror which may be inserted in an optical path of the measurement beam. The same mirror might also be used to minimize the aberrations for the first measurement.

Embodiment 5: Two Lens System with Moving Lens

The optical device 150 in FIG. 8 may comprise two lenses that generate aberrations, which compensate each other when both lenses are on an optical axis of the measurement beam. When one lens is off axis the aberration appears. For instance, two lenses with spherical aberration in the parallel beam: coma will be generated if one lens is off axis.

Embodiment 6: Single Lens System with Moving Lens

The optical device 150 in FIG. 8 or the switchable optical device 157 in FIG. 11 may comprise a lens with a non-optimal design for optical field that is moved perpendicular to the optical axis by means of an actuator, for instance a voice coil motor.

Embodiment 7: Electrowetting

The optical device 150 in FIG. 8 or the switchable optical device 157 in FIG. 11 may comprise an electrowetting lens. Beam deformation or to be more precise aberration may be changed by putting a voltage on one or two optical fluids of the electrowetting lens.

Embodiment 8: Multiple Mesa Laser

Figure 15:
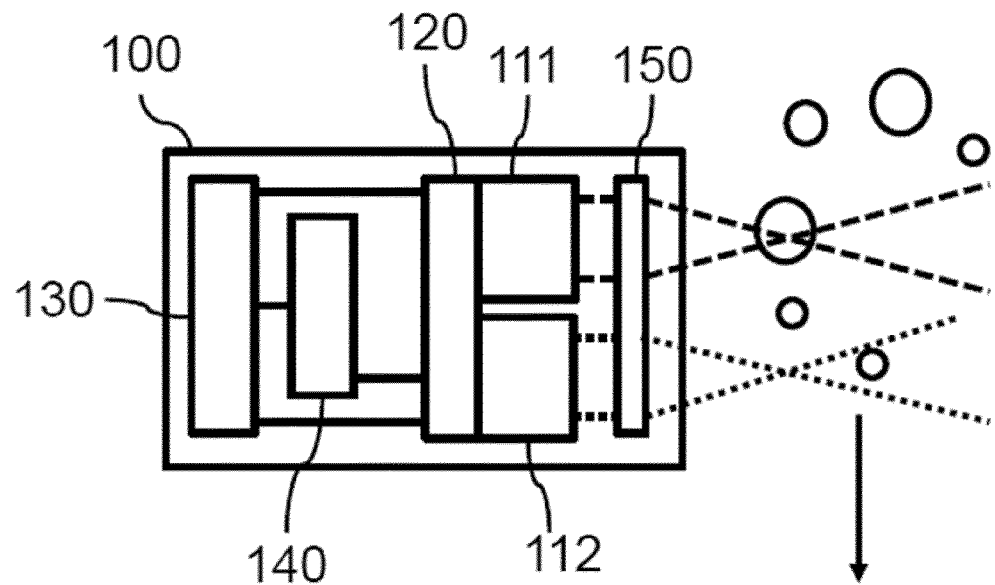
FIG. 15 shows a principal sketch of a sixth laser sensor module

A very elegant solution for the embodiment discussed with respect to FIG. 15 showing a principal sketch of a sixth laser sensor module is obtained by using a multiple mesa laser. The embodiment is quite similar to the embodiment discussed with respect to FIG. 12. The laser chip will have two independent lasers 111, 112 on top of one detector 120 photodiode on one and the same chip. The optical alignment will be done in the way to have the first laser 111 on axis (best signal) and to have the second laser 112 for example 40 μm off axis. The second laser beam will result in a larger spot-size due to aberrations and consequently a limited capability to measure small particles. The two lasers will be operated by means of the electrical driver 130 in time switch mode. The first optimally aligned laser provides the first measurement and the second laser provides the second measurement.

Embodiment 9: Multiple Mesa Laser Operated in Parallel

By using two lasers 111, 112 with each having his own detector 121, 122 as discussed with respect to FIG. 12 and detection electronics in parallel, the first and second measurement can be performed simultaneously by using either a first and second optical device 151, 152 as discussed with respect to FIG. 12 or one optical device 150 as discussed with respect to FIG. 15 in order to generate to measurement beams with different aberration in the respective focus region.

Figure 16:
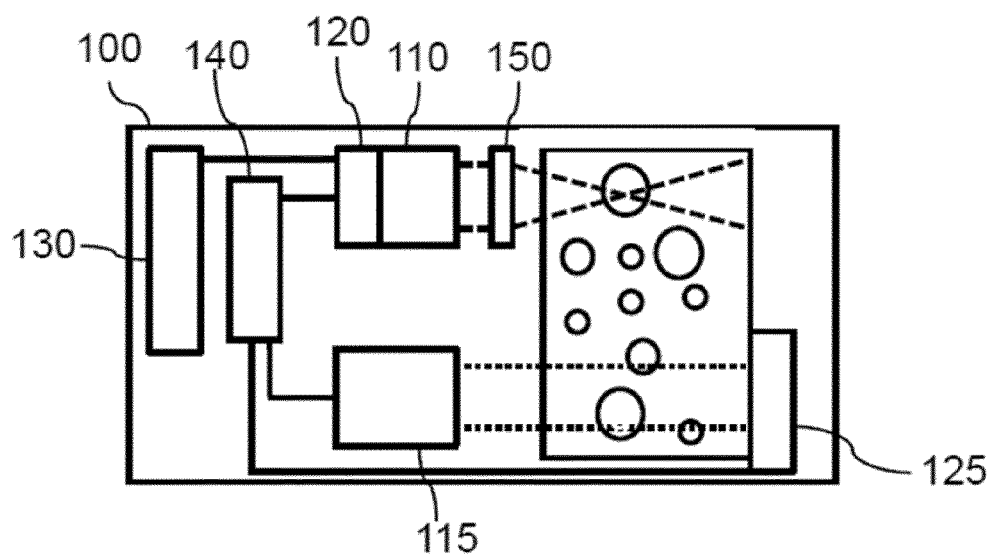
FIG. 16 shows a principal sketch of a seventh laser sensor module

FIG. 16 shows a principal sketch of a seventh laser sensor module 100. The sixth laser sensor module 100 comprises a laser 110 with an integrated detector 120 emitting laser light through an optical device 150 which is in this case a lens. The integrated detector 120 is an integrated photodiode which is part of the layer structure of the laser 110. The sixth laser sensor module 100 further comprises a particle detection unit with the light source (LED) 115 and a photodetector 125 which is arranged such that light emitted by the LED is received by the photodetector 125. The photodetector 125 is arranged to measure variations of the intensity of light emitted by the LED caused by particles passing the volume between the LED and the photodetector 125. The second laser sensor module 100 further comprises an electrical driver 130, and evaluator 140. The evaluator 140 is connected to the laser 110 or more precisely the detector 120, the LED, the photodetector 125 and the electrical driver 130. The electrical driver 130 supplies electrical power to the laser 110 in order to emit laser light and to the LED. The laser 110 is in this case a vertical cavity surface emitting laser (VCSEL) with integrated photodiode. The laser sensor module 100 is connected to a power supply (not shown) which provides the power which is modulated and supplied by means of the electrical driver 130. The optical device 150 is arranged to provide a numerical aperture (NA) of 0.06 in order to enable measurements of small particles with a particle diameter of around 300 nm. The detector 120 is arranged to determine a self-mixing interference signal in order to generate a first particle size distribution function. The particle detection unit is less sensitive and not arranged to determine particles with a size of around 300 nm. The signals detected by photodetector 125 are therefore used to determine a second particle size distribution function. The evaluator 140 is adapted to determine the corresponding calibration factor q in a memory device in order to calculate the particle measure of particles with the particle size of 300 nm or less based on the first and second particle size distribution function as described above. An alternative concept for the particle detection unit may be to place the photodetector 125 under 90 degree, such that only the scattered light from the particles is detected instead of the transmission change. The sensitivity of such an arrangement may be increased in comparison to the transmission configuration discussed above.

Figure 17:
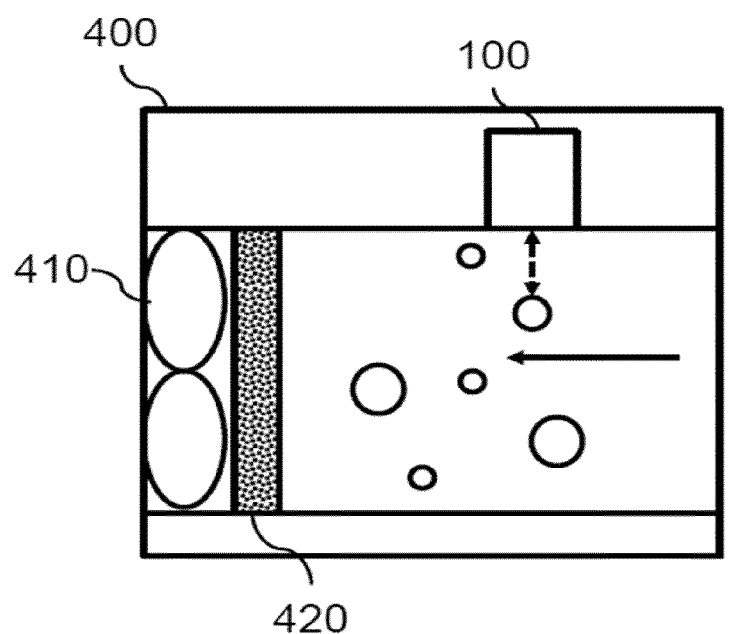
FIG. 17 shows a principal sketch of an air purifier

FIG. 17 shows a principal sketch of an air purifier 400. The air purifier 400 comprises a particle flow control device 410 (e.g. fan), a filter system 420 and a laser sensor module 100 according to any one of the embodiments described above. The fan and the filter system 420 are arranged in e.g. a tube in which air flows. The fan accelerates the air along the axis of the tube in order to generate a defined flow or particle velocity. The laser sensor module 100 determines the particle measure of the intended particle size and optionally the velocity of the particle flow. The air purifier 400 may be integrated in an air conditioner. The air conditioner may, for example, provide a signal if the particle measure is above a threshold value. The laser sensor module 100 may preferably receive information from the particle flow control device 410 in order to calibrate the measurements with respect to, for example, the velocity of the air or particle flow caused by the particle flow control device 410. The particle flow control device 410 may in this case be controlled by means of the laser sensor module 100 in order to enable two or more particle of flow velocities. The laser sensor module 100 comprises in this case a flow controller to control the particle flow control device 410. The air purifier 400 may alternatively comprise a processor and corresponding storage devices in order to receive data from the particle flow control device 410 and the laser sensor module 100. The arrow indicates the direction of the air. The measurement results of the laser sensor module 100 may be used to decide whether the air purifier can be switched off by means of a corresponding control circuit or control application running on a processor of the air purifier when the air is cleaned.

Figure 18:
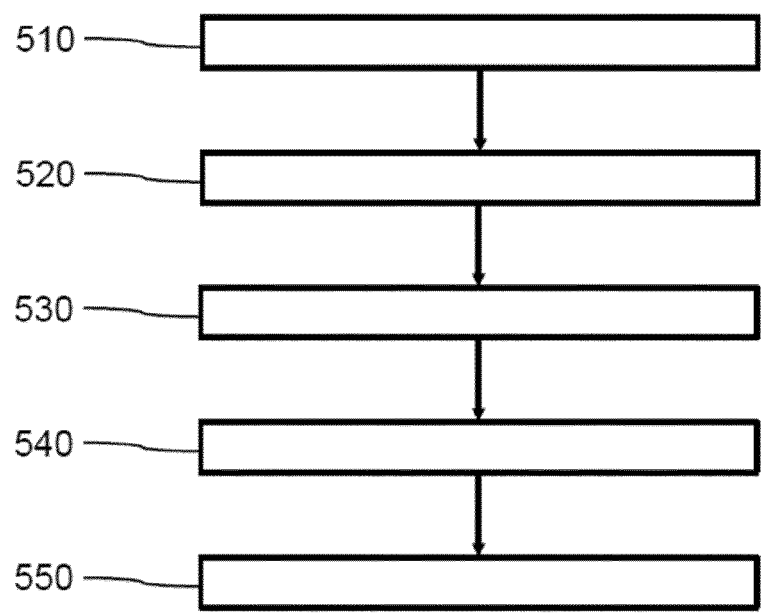
FIG. 18 shows a principal sketch of a method of detecting ultra-fine particles In the Figures, like numbers refer to like objects throughout. Objects in the Figures are not necessarily drawn to scale.

FIG. 18 shows a principal sketch of a method of detecting small especially ultrafine particles. Laser light is emitted in step 510 to at least one focus region. At least one self-mixing interference signal is determined in step 520. A first particle size distribution function with a first sensitivity is determined in step 530 by means of at least one measurement result determined based on the at least one self-mixing interference measurement. A second particle size distribution function with the second sensitivity is determined in step 540. The second sensitivity is different from the first sensitivity. A particle measure of the particles with particle size of 300 nm or less is determined by subtracting the second particle size distribution function multiplied with a calibration factor q from the first particle size distribution function.

It is a basic idea of the present invention to provide a laser sensor module 100 and a corresponding method for sensing small particles with a particle size of less than 300 nm by generating two measurement results or performing to measurements with different sensitivities in which a particle measure of the small or even ultrafine particles in a certain size regime is derived by subtracting q times the number of particles in the insensitive mode from the number of particles in the sensitive mode. The smaller particles are essentially not visible in the insensitive mode but the shape of the measurement result for bigger particles is essentially the same but scaled with the calibration factor q. The invention enables a simple and low-cost particle detection module or particle detector based on laser self-mixing interference which can detect particles with a size of 100 nm or even less.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS 100 laser sensor module
110 laser
111 first laser
112 second laser
115 light source
120 detector
121 first detector
122 second detector
125 photodetector
130 electrical driver
140 evaluator
150 optical device
151 first optical device
152 second optical device
155 optical attenuator
157 switchable optical device
160 controller
170 movable mirror
210 receiving self-mixing interference signal
220 digitalization of the self-mixing interference signal
230 determine detection threshold
244 determine at first threshold
248 determine at second threshold
250 determine number of ultrafine particles
301 detected particles (number/$\mu g/m^3$)
302 particle size ($\mu m$)
303 particle count rate (#/number/($\mu g/m^3$))
305 number of detected particles
306 number of detected particles
307 number of ultrafine particles
308 number of ultrafine particles
310 number of detected particles
311 number of detected particles
312 number of detected particles
315 number of ultrafine particles
316 number of ultrafine particles
317 simulated data
318 experimental data
320 PM 2.5 ($\mu g/m^3$)
321 Particle count (number/s)
330 measurement data
335 fit
340 90% CI
350 90% PI
365 first aberration level
366 second aberration level 367 third aberration level
400 air purifier
410 particle flow control device
420 filter system
510 emitting laser light
520 determine self-mixing interference signal
530 determine first particle size distribution function
540 determine second particle size distribution function
550 determining number of small particles

The invention claimed is:

1. A laser sensor comprising:
at least one laser arranged to emit laser light to at least one focus region in reaction to signals provided by at least one electrical driver,
at least one detector arranged to determine a self-mixing interference signal of an optical wave within a laser cavity of the at least one laser, wherein the self-mixing interference signal is caused by reflected laser light reentering the laser cavity, the reflected laser light being reflected by a particle receiving at least a part of the laser light,
the laser sensor arranged to perform at least one self-mixing interference measurement, wherein the laser sensor is arranged to determine a first particle size distribution function,
wherein the first particle size distribution function is characterized by a first sensitivity with respect to particle size detection,
wherein at least one measurement result is determined based on the at least one self-mixing interference measurement,
wherein the laser sensor is arranged to determine a second particle size distribution function,
wherein the second particle size distribution function is characterized by a second sensitivity with respect to particle size detection,
wherein the second sensitivity is different from the first sensitivity,
wherein either the first or the second sensitivity is chosen such that particles smaller than a defined threshold particle size of 300 nm or less are not detected, wherein the first and second particle size distribution functions have essentially an identical shape above the defined threshold particle size scaled with a calibration factor q,
at least one evaluator circuit arranged to determine a particle measure of the particle size of 300 nm or less, wherein the particle measure is determined by subtracting the second particle size distribution function multiplied with the calibration factor q from the first particle size distribution function.

2. The laser sensor according to claim 1, wherein the laser sensor is arranged to determine the second particle size distribution function using the at least one measurement.

3. The laser sensor according to claim 2:
wherein the at least one evaluator circuit is arranged to apply a first threshold to a measurement result,
wherein the first threshold measurement result is based on the at least one self-mixing interference measurement,
wherein the at least one evaluator circuit is arranged to determine the first particle size distribution function using the measurement result and the first threshold,
wherein the at least one evaluator circuit is arranged to apply a second threshold to the measurement result,
wherein the second threshold is determined based on the at least one self-mixing interference measurement, the second threshold being different from the first threshold,
wherein the at least one evaluator circuit is arranged to determine the second particle size distribution function using the measurement result and the second threshold.

4. The laser sensor according to claim 2:
wherein the laser sensor is arranged to perform a first self-mixing interference measurement with the first sensitivity,
wherein the laser sensor is arranged to perform a second self-mixing interference measurement with the second sensitivity,
wherein the at least one evaluator circuit is arranged to determine the first particle size distribution function using a first measurement result,
wherein the first measurement result is determined based on the first self-mixing interference measurement,
wherein the at least one evaluator circuit is arranged being further adapted to determine the second particle size distribution function using a second measurement result,
wherein the second measurement result is determined based on the second self-mixing interference measurement.

5. The laser sensor according to claim 1, wherein the laser sensor comprises an optical device, wherein the optical device is arrange to focus the laser light, the optical device being characterized by a numerical aperture of at least 0.06.

6. The laser sensor according to claim 4, further comprising:
an optical redirection device, where the optical redirection device is arranged to move the focus region of the laser light,
at least one controller circuit, wherein the at least one controller circuit is arranged to control the movement of the focus region during the first self-mixing interference measurement with a first velocity and during the second self-mixing interference measurement with a second velocity,
wherein the second velocity is different from the first velocity.

7. The laser sensor according to claim 4, further comprising:
at least one particle flow control device,
wherein the at least particle flow control device is arranged to control a velocity of a particle flow,
wherein the particle sensor module comprises at least one flow controller circuit,
wherein the at least on flow controller circuit is arranged to control the velocity of the particle flow using the at least one particle flow control device during the first self-mixing interference measurement,
wherein the first self-mixing interference measurement uses a first particle flow velocity,
wherein the second self-mixing interference measurement uses a second particle flow velocity,
wherein the second particle flow velocity is different from the first particle flow velocity.

8. The laser sensor according to claim 4 comprising:
at least a first laser arranged to emit a first laser light to a first focus region in reaction to first signals provided by the at least one electrical driver,
at least a second laser arranged to emit a second laser light to a second focus region in reaction to second signals provided by the at least one electrical driver,
at least one detector arranged to determine the first self-mixing interference signal and second self-mixing interference signal, at least one optical device, wherein the first laser light and the second laser light are emitted through the at least one optical device such that a first aberration level of the first laser light in the first focus region is different than a second aberration level of the second laser light in the second focus region.

9. The laser sensor according to claim 4 comprising:
at least a first laser arranged to emit a first laser light to a first focus region in reaction to first signals provided by the at least one electrical driver,
at least a first detector arranged to determine the first self-mixing interference signal,
at least a second laser arranged to emit a second laser light to a second focus region in reaction to second signals provided by the at least one electrical driver,
at least a second detector arranged to determine the second self-mixing interference signal.

10. The laser sensor according to claim 9,
wherein the first laser is optically coupled to a first optical device with a first numerical aperture,
wherein the second laser is optically coupled to a second optical device with a second numerical aperture,
wherein the second numerical aperture is different from the first numerical aperture.

11. The laser sensor according to claim 1,
wherein the laser sensor module comprises a particle detection unit
wherein the particle detection units determines the second particle size distribution function.

12. An air purifier, a sensor box or a wearable device comprising the laser sensor according to claim 1.

13. A method of detecting particles comprising:
emitting laser light to at least one focus region,
determining at least one self-mixing interference signal,
determining a first particle size distribution function, wherein the first particle size distribution function is characterized by a first sensitivity using at least one measurement result, wherein the at least one measurement result is determined based on the at least one self-mixing interference measurement,
determining a second particle size distribution function, wherein the second particle size distribution function is characterized by a second sensitivity, wherein the second sensitivity is different from the first sensitivity and wherein the first or the second sensitivity is chosen such that particles smaller than a defined threshold particle size of 300 nm or less are not detected, and wherein the first and second particle size distribution functions have essentially an identical shape above the defined threshold particle size scaled with a calibration factor q, and
determining a particle measure of the particle size, wherein the particle measure is determined by subtracting the second particle size distribution function multiplied with the calibration factor q from the first particle size distribution function.

14. The method according to claim 13, further comprising:
applying a first threshold to a measurement result to determine the first particle size distribution function, wherein the measurement result is determined based on the at least one self-mixing interference measurement,
applying a second threshold to the measurement result in order to determine the second particle size distribution function.

15. A computer program product comprising computer code which can be saved on at least one non-volatile memory device, wherein the computer code performs the method as claimed in claim 13.

16. The method of claim 13 further comprising:
performing a first self-mixing interference measurement with the first sensitivity;
performing a second self-mixing interference measurement with the second sensitivity;
determining the first particle size distribution function using a first measurement result, wherein the first measurement result is determined based on the first self-mixing interference measurement;
determining the second particle size distribution function using a second measurement result, wherein the second measurement result is determined based on the second self-mixing interference measurement.

17. The method of claim 16 further comprising:
moving the focus region of the laser light; and
controlling the movement of the focus region during the first self-mixing interference measurement with a first velocity and during the second self-mixing interference measurement with a second velocity;
wherein the second velocity is different from the first velocity.

18. The method of claim 16 further comprising:
controlling a velocity of a particle flow; and
controlling the velocity of the particle flow using the at least one particle flow control device during the first self-mixing interference measurement,
wherein the first self-mixing interference measurement uses a first particle flow velocity,
wherein the second self-mixing interference measurement uses a second particle flow velocity,
wherein the second particle flow velocity is different from the first particle flow velocity.

19. The method of claim 13 further comprising:
emitting a first laser light to a first focus region in reaction to first signals provided by the at least one electrical driver;
emitting a second laser light to a second focus region in reaction to second signals provided by the at least one electrical driver; and
determining the first self-mixing interference signal and second self-mixing interference signal,
wherein the first laser light and the second laser light are emitted through the at least one optical device such that a first aberration level of the first laser light in the first focus region is different than a second aberration level of the second laser light in the second focus region.

20. The method of claim 16 further comprising:
emitting a first laser light to a first focus region in reaction to first signals provided by the at least one electrical driver;
determining the first self-mixing interference signal;
emitting a second laser light to a second focus region in reaction to second signals provided by the at least one electrical driver; and
determining the second self-mixing interference signal.

* * * * *